United States Patent
Hanks

(10) Patent No.: US 11,641,428 B2
(45) Date of Patent: May 2, 2023

(54) OFDM AND OFDMA PROFILE ASSIGNMENTS FOR CABLE MODEMS

(71) Applicant: ARRIS Enterprises LLC, Suwanee, GA (US)

(72) Inventor: William Turner Hanks, Carol Stream, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 199 days.

(21) Appl. No.: 16/901,549

(22) Filed: Jun. 15, 2020

(65) Prior Publication Data

US 2020/0404103 A1   Dec. 24, 2020

Related U.S. Application Data

(60) Provisional application No. 62/863,235, filed on Jun. 18, 2019.

(51) Int. Cl.
*H04L 12/24* (2006.01)
*H04M 7/12* (2006.01)
*H04L 41/12* (2022.01)

(52) U.S. Cl.
CPC .......... *H04M 7/1215* (2013.01); *H04L 41/12* (2013.01); *H04M 2207/14* (2013.01)

(58) Field of Classification Search
CPC ... H04L 5/0046; H04L 5/0007; H04L 1/0005; H04L 1/0003; H04L 41/12; H04L 43/08
See application file for complete search history.

(56) References Cited

U.S. PATENT DOCUMENTS

| | | | |
|---|---|---|---|
| 11,303,386 B1* | 4/2022 | Rupe | H04L 67/30 |
| 2018/0102868 A1* | 4/2018 | Sundaresan | H04L 43/08 |
| 2018/0131582 A1* | 5/2018 | Schnitzer | H04L 41/5038 |
| 2018/0262412 A1 | 9/2018 | Hanks et al. | |
| 2019/0305876 A1* | 10/2019 | Sundaresan | H04L 1/0019 |
| 2020/0389239 A1* | 12/2020 | Garcia | H04L 1/0009 |
| 2021/0091989 A1* | 3/2021 | Zaltsman | H04L 27/2647 |

OTHER PUBLICATIONS

Greg White and Karthik Sundaresan, DOCSIS 3.1 Profile Management Application and Algorithms, Cable Television Laboratories, Inc. (CableLabs) (Year: 2016).*
Ghorbel et al, Principal Component-Based Approach for Profile Optimization Algorithms in DOCSIS 3.1, IEEE Transactions on Network and Service Management, Sep. 2018 (Year: 2018).*
Sumayia Abedin, "On Profile Optimization in DOCSIS 3.1 Networks Exploiting Traffic Prediction", Thesis, Master of Applied Science, The University of British Columbia, (Year: 2018).*
PCT International Search Report & Written Opinion, RE: Application No. PCT/US2020/037750, dated Sep. 14, 2020.
Mehmood et al. "Bit Loading Profiles for High-Speed Data in DOCSIS3.1", IEEE Communications Magazine, Mar. 2015.

* cited by examiner

*Primary Examiner* — Aristocratis Fotakis
(74) *Attorney, Agent, or Firm* — Chernoff, Vilhauer, McClung & Stenzel, LLP

(57) ABSTRACT

Systems and methods for dynamically updating bit loading profile assignments among a plurality of cable modems.

14 Claims, 4 Drawing Sheets ary Application Ser. No. 62/863,235, filed Jun. 18, 2019, the complete contents of which is hereby incorporated herein by reference.

OFDM AND OFDMA PROFILE ASSIGNMENTS FOR CABLE MODEMS

CROSS REFERENCE TO RELATED APPLICATIONS

This application claims priority under 35 U.S.C. § 119(e) from earlier filed U.S. Provisional Application Ser. No. 62/863,235, filed Jun. 18, 2019, the complete contents of which is hereby incorporated herein by reference.

BACKGROUND

The subject matter of this application generally relates to the creation and assignment of bit loading profiles to cable modems in a DOCSIS transmission architecture.

Orthogonal Frequency Division Multiplexing (OFDM) technology was introduced as a cable data transmission modulation technique during the creation of the CableLabs DOCSIS 3.1 specification. OFDM technology was defined for use directly in the downstream direction and was adapted for multiple access (Orthogonal Frequency Division with Multiple Access—OFDMA) for use in the upstream direction. In each direction, the relatively wide channel is subdivided into many small subcarriers. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

The purpose of OFDM/OFDMA technology is to maximize the efficiency of data transmissions across a cable data network by optimizing the QAM modulation level used for each subcarrier of RF frequency bandwidth. Ideally, each cable modem would be assigned its own vector of per-subcarrier QAM modulation levels, i.e. a. bit loading vector, that is uniquely optimized for that cable modem. For cost reasons, however, the DOCSIS 3.1 specification defines a compromise where groups of cable modems having similar RF characteristics can be assigned the same bit loading vector, if that vector is constructed such that that all cable modems assigned that vector could use it. In this manner, the needed number of bit loading vectors could be reduced to a cost-manageable set of "bit loading profiles" that could each be assigned to multiple cable modems at once. For example, the current generation of DOCSIS allows head ends that communicate with cable modems to utilize up to sixteen bit loading profiles per channel in the downstream direction and up to seven bit loading profiles per channel in the upstream direction. Similarly, the current generation of DOCSIS permits each cable modem to be assigned up to five profiles per channel in the downstream direction and up to two profiles per channel in the upstream direction.

However, because each cable modem is no longer assigned a bit loading profile uniquely optimized for that cable modem, transmissions over the network are more prone to errors. What is desired, therefore, is an improved method of determining a plurality of bit loading vectors that are assigned among cable modems in a DOCSIS network.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

OFDM is based on the well-known technique of Frequency Division Multiplexing (FDM). In FDM different streams of information are mapped onto separate parallel frequency channels. Each FDM channel is separated from the others by a frequency guard band to reduce interference between adjacent channels.

Orthogonal Frequency Division Multiplexing (OFDM) extends the FDM technique by using multiple subcarriers within each channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme (e.g. QPSK, 16QAM, etc.) at low symbol rate. However, the combination of many subcarriers enables data rates similar to conventional single-carrier modulation schemes within equivalent bandwidths.

Figure 1:
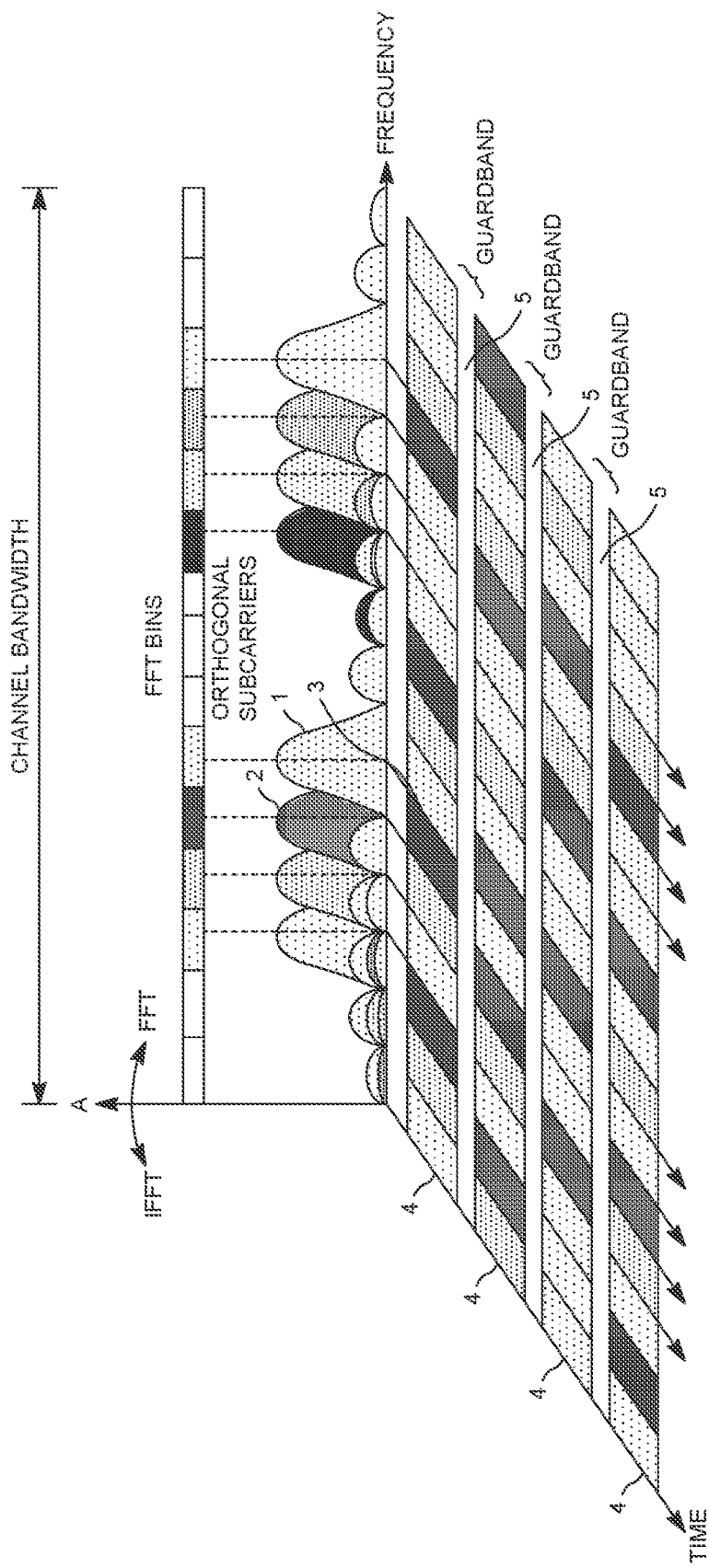
FIG. 1 illustrates an Orthogonal Frequency Division Multiplexing technique.

Referring for example to FIG. 1, in the frequency domain, adjacent orthogonal tones or subcarriers 1 and 2 may be each independently modulated with complex data. Though only two subcarriers are illustrated in FIG. 1, those of ordinary skill in the art will appreciate that a typical OFDM transmission will include a large number of orthogonal subcarriers. As just note noted, subcarriers 1 and 2 (as well as all other subcarriers) are orthogonal to each other. Specifically, as can be seen in FIG. 1, subcarrier 1 has spectral energy comprising a sinc function having a center frequency 3 with sidebands having peaks and nulls at regular intervals. These sidebands overlap those of subcarrier 2, but each of the spectral peaks of subcarrier 1 align with the nulls of subcarrier 2. Accordingly, the overlap of spectral energy does not interfere with the system's ability to recover the original signal; the receiver multiplies (i.e., correlates) the incoming signal by the known set of sinusoids to recover the original set of bits sent.

In the time domain, all frequency subcarriers 1, 2 etc. are combined in respective symbol intervals 4 by performing an Inverse Fast Fourier Transform (IFFT) on the individual subcarriers in the frequency domain. Guard bands 5 may preferably be inserted between each of the symbol intervals 4 to prevent inter-symbol interference caused by multi-path delay spread in the radio channel. In this manner, multiple symbols contained in the respective subcarriers can be concatenated to create a final OFDM burst signal. To recover the signal at a receiver, a Fast Fourier Transform (FFT) may be performed to recover the original data bits.

Figure 2:
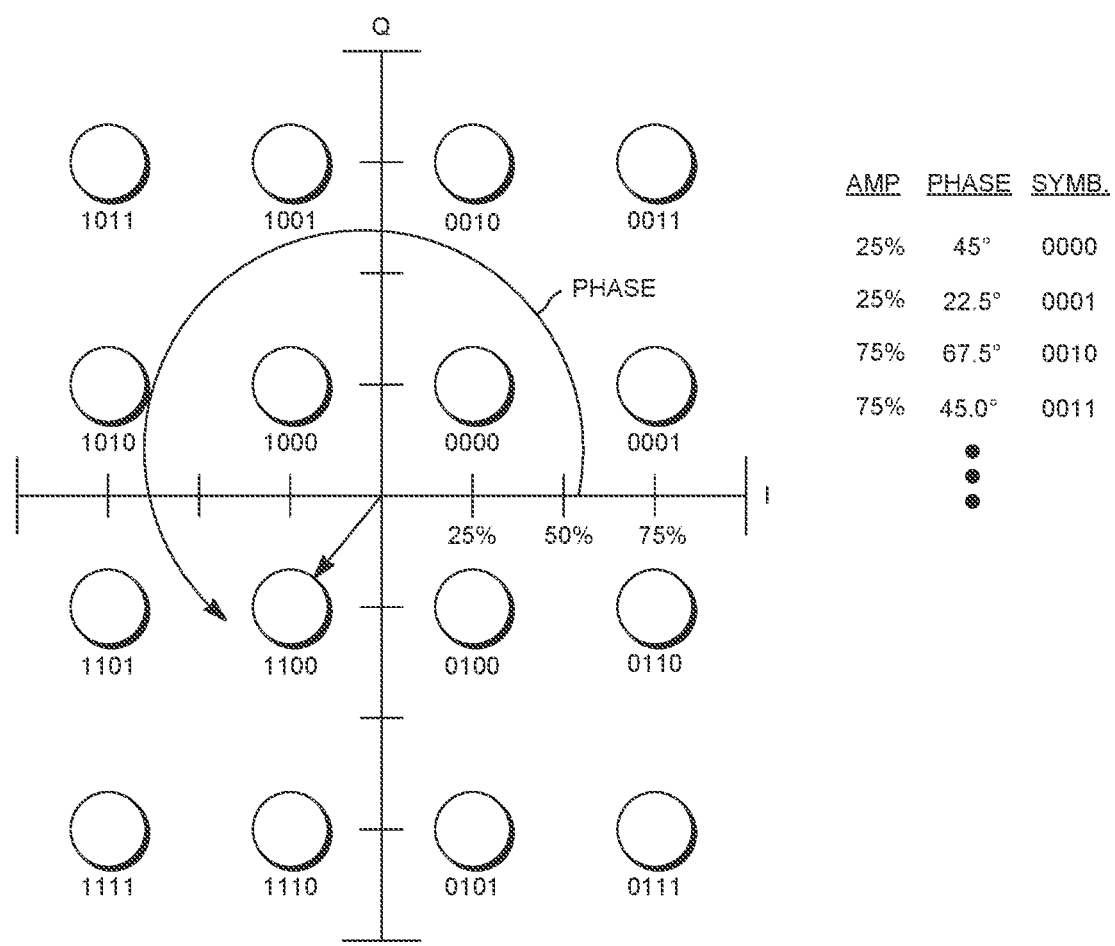
FIG. 2 illustrates a Quadrature Amplitude Modulation technique.

As also noted previously, each subcarrier in an OFDM transmission may be independently modulated with complex data among a plurality of predefined amplitudes and phases. FIG. 2, for example, illustrates a Quadrature Amplitude Modulation (QAM) technique where a subcarrier may be modulated among a selective one of sixteen different phase/amplitude combinations (16QAM). Thus, for example, subcarrier 1 of FIG. 1 may in a first symbol interval transmit the symbol 0000 by having an amplitude of 25% and a phase of 45° and may in a second symbol interval transmit the symbol 1011 by having an amplitude of 75% and a phase of 135°. Similarly, the subcarrier 2 may transmit a selected one of a plurality of different symbols.

FIG. 2 illustrates a 16QAM modulation technique, but modem DOCSIS transmission architectures allow for modulations of up to 16384QAM. Moreover, each of the subcarriers 1, 2, etc. shown in FIG. 1 may operate with its own independent QAM modulation, i.e. subcarrier 1 may transmit a 256QAM symbol while subcarrier 2 may transmit a 2048QAM symbol. Thus, in order for a receiver and a transmitter to properly communicate, a bit loading profile is a vector that specifies, for each subcarrier, the modulation order (16QAM, 256QAM, etc) used by the subcarrier during a symbol interval. The current DOCSIS 3.1 specification allows each cable modem to be assigned up to five different bit loading profiles in the downstream direction, and up to two different bit loading profiles in the upstream direction. The bit loading profile used for a given symbol interval is communicated between the cable modem and a head end, so that transmitted information can be properly decoded.

Figure 3:
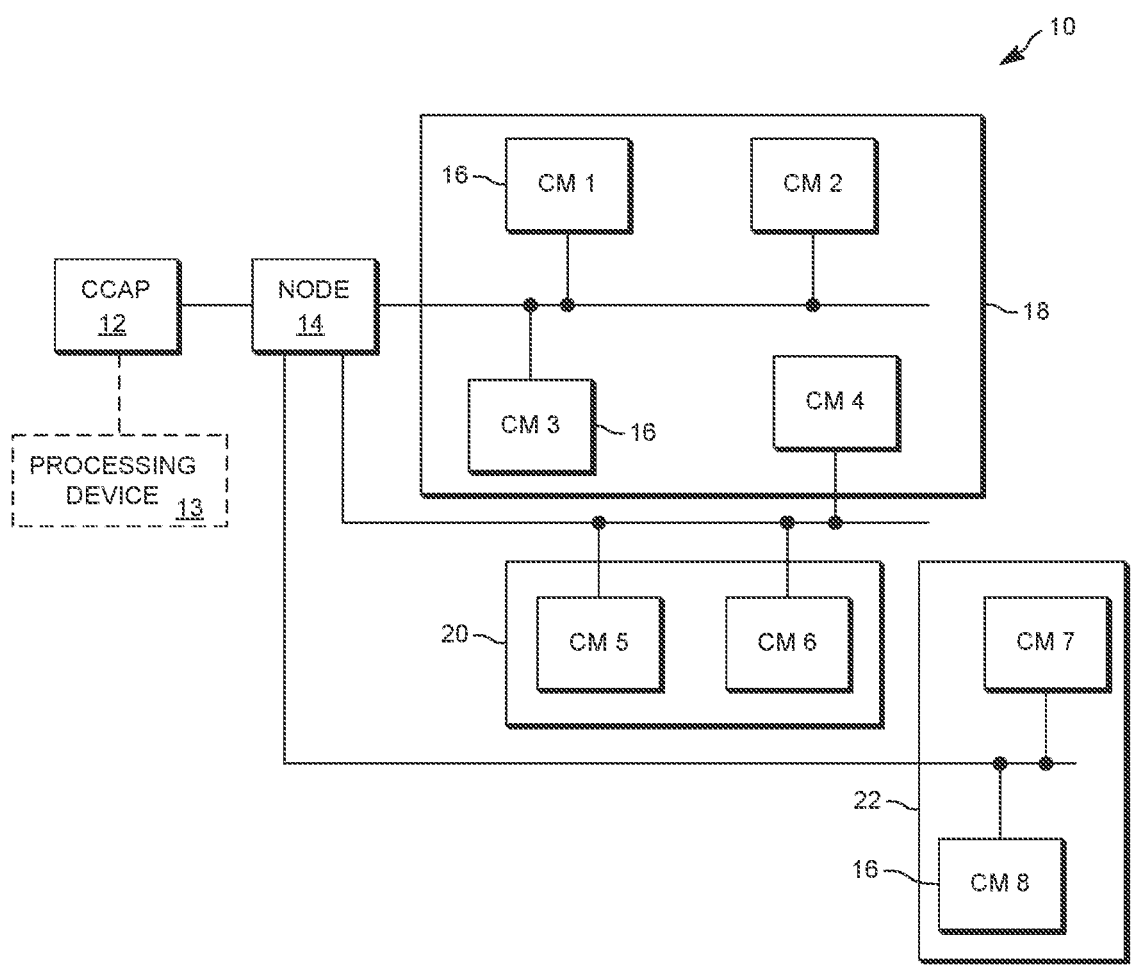
FIG. 3 shows a DOCSIS network transmission architecture for delivering content to a plurality of cable modems, organized into groups so as to reduce transmission errors, and where the cable modems each use one or more bit loading profiles.

FIG. 3 illustrates a system that uses bit loading profiles to communicate data in a DOCSIS architecture. Specifically, a system 10 may include a Converged Cable Access Platform (CCAP) 12 typically found within a head end of a video content and/or data service provider. Those of ordinary skill in the art will recognize that the disclosed systems and methods may be used with a Cable Modem Termination Service (CMTS) instead of a CCAP. The CCAP 12 communicates with a plurality of cable modems 16 at its customers' premises via a network through one or more nodes 14. Typically, the network may be a hybrid fiber-coaxial network where the majority of the transmission distance comprises optical fiber, except for trunk lines to cable taps (not shown) at the customers' premises and cabling from the taps to the cable modems 16, which are coaxial. More recent architectures, e.g. Fiber-to-the Premises (FTTP) however, have replaced the entire line from the upstream node with optical fiber.

As already mentioned, ideally each cable modem 16 would be assigned a bit loading profile specifically tailored to the performance characteristics of that cable modem. For example, higher nodulation orders can be assigned to subcarriers experiencing higher a SNR characteristic over a channel used by a cable modem, and lower modulation orders may be best for subcarriers with a low SNR characteristic. In this manner, the bandwidth efficiency of transmissions to and from a cable modem are high when if the cable modem's ideal bit loading vector closely follows the bit loading profile in use by the cable modem. However, because the DOCSIS standard restricts the number of available profiles that can be used by cable modems, a CCAP 12 must communicate with multiple cable modems 16 with different SNR profiles using the same bit loading profile. For example, as FIG. 3 shows an example where cable modems 16 are segmented into groups 18, 20, and 22 where the cable modems 16 in each group are assigned a common bit loading profile by the CCAP 12. This virtually guarantees that not all cable modems will use a bit loading profile that closely follows its optimum bit loading vector.

Thus, in order to most efficiently use the limited number of available bit loading profiles, the CCAP 12 preferably divides cable modems 16 into groups that each have similar performance characteristics. To this end, the CCAP 12 may periodically include in the downstream transmission known pilot tones that together span the entire OFDM downstream bandwidth. Each cable modem 16 then uses these pilots to measure its error for received downstream transmissions at each subcarrier frequency, where the error at a particular modulation frequency is measured based on the vector in the I-Q plane (shown in FIG. 2) between the ideal constellation point at that modulation order and the actual constellation point received by the receiver. Such error measurements may comprise any of several available forms, including the actual error vector, the Euclidian distance between these two points, or the Modulation Error Ratio (MER) calculated from the error vector. Alternatively, in some embodiments, the error measurement may be expressed as a maximum QAM value that a cable modem may reliably use at a given subcarrier, given the measured error. For example, the DOCSIS 3.1 PHY specification contains tables that map modulations orders to the minimum carrier-to-noise ratios (approximated by MER) required to carry them, as shown in the following exemplary table in the downstream direction:

| Constellation | CNR (1 GHz) | CNR (1.2 GHz) |
|---|---|---|
| 4096 | 41 | 41.5 |
| 2048 | 37 | 37.5 |
| 1024 | 34 | 34. |
| 512 | 30.5 | 30.5 |
| 256 | 27 | 27 |
| 128 | 24 | 24 |
| 64 | 21 | 21 |
| 16 | 15 | 15 |

In this exemplary table, "CNR" or Carrier Boise Ration is defined as the total signal power in an occupied bandwidth divided by the total noise in that occupied bandwidth, and ideally is the equivalent of equalized MER.

The collection of the errors for a cable modem, across all subcarrier frequencies, produces the modulation error vector for that cable modem 16, which is transmitted back to the CCAP 12. For upstream transmissions, the process is generally reversed; the CCAP 12 commands each cable modem to send known pilot tones to the CCAP 12 together spanning the entire OFDM upstream bandwidth in a single upstream probing signal for each particular cable modem 16. The CCAP 12 uses these received probing signals to estimate the upstream modulation error vectors for each of the cable modems.

Once the CCAP 12 has assembled the modulation error vectors for all cable modems that it serves, it preferably uses these vectors to organize the cable modems into "N" groups of cable modems, where "N" is at most the number of profiles available to the collection of cable modems. For example, in a DOCSIS 3.1 environment, cable modems could be arranged in up to sixteen groups for receiving signals in the downstream direction and up to seven groups for receiving signals in the upstream direction.

In a preferred embodiment, a K-means clustering technique is used to arrange cable modems into groups. For example, in one such technique "N" seed vectors may be initially chosen by, e.g. randomly selecting error vectors from among the collection of cable modems, and using each of the cable modems associated with these vectors as the initial members of the "N" groups. Then, another cable modem is selected, and it is placed in the group for which the cable modem's error vector has the shortest Euclidean distance to the centroid of the error vectors already within that group. Once a cable modem is added to the group, the centroid for that group is updated based on the error vector of the added cable modem. This process repeats until all cable modems have been assigned to a group. Alternative K-means clustering techniques may also be employed, by for example, initially assigning all cable modems to the initial "N" groups based on the minimum Euclidean distance to the initial seed vectors and then recomputing the centroids of each group. After recomputing the centroids, each cable modem is reassigned, a new centroid is computed etc. until the process converges to a point where no cable modems are reassigned.

Once all cable modems are finally assigned into the desired plurality of groups, a set of available bit loading profiles may be generated for the head end to assign to the population of cable modems serviced by the head end in each of the upstream and downstream directions, and subsequently the cable modems in each group may be assigned profiles from this set. For example, some methods may select an initial or starting set of bit loading profiles, each representing a different tier or quality of service, where the bit loading profiles are subsequently adjusted based upon the groupings of cable modems as appropriate where, say a small change in a profile can bring several cable modems into that tier or to guarantee a tier of service to a specific cable modem. Such methods are disclosed in prior U.S. Pat. No. 9,647,786 which is hereby incorporated in its entirety into this disclosure. Preferably in some embodiments, for each cable modem in a group, the nearest five bit loading profiles, ordered by vector distance, should be assigned to the cable modem in the downstream direction and the nearest two bit loading profiles, ordered by vector distance should be assigned to the cable modem in the upstream direction.

The effectiveness of the clustering technique previously described is heavily influenced by the selection of the initial seed vectors for each of the profile groups. As noted above, one technique is to randomly select seed vectors from among the error vectors in the population of cable modems served by a head end. However, this approach has limited effectiveness in maximizing channel efficiency, given the hit-or-miss approach of random seed vector selection. Moreover, random selection of seed vectors frequently causes drastic changes in configuration parameters when the system is updated based on new MER measurements. As another example, small changes in MER measurements may cause the K-means clustering technique to group cable modems in an entirely new way such that cable modems may not be associated with any of the same bit loading profiles. Widespread system changes may even be necessary when a cable modem is assigned the same set of profile vectors or a very similar set of profile vectors before and after a management update. For example, after incorporating new MER measurements, profile 1 for a cable modem after an update may be the same as or similar to profile 3 for that cable modem before the update, yet the new profile assignments require signalling of widespread configuration changes to the entire population of cable modems.

Accordingly, in some embodiments, system information may be used to select the seed vectors used to group cable modems for profile assignments. In one such embodiment, for example, the seed vectors used to group cable modems may be based on bit loading profiles currently being used in the system. For example, each possible QAM level for a subcarrier in a channel may be associated with an MER value or other measured error at that subcarrier frequency that would allow acceptable transmission of data at the given QAM level. In this manner, a current bit loading profile being used in the system can quickly be converted to a seed vector via use of a table. In alternative embodiments, the error measurements themselves may be expressed as QAM values that represent the maximum modulation order that can be used at a given subcarrier frequency for acceptable transmission of data, given the measured error. In such an embodiment, the K-means clustering technique will use centroids expressed in QAM values such that a currently-used bit loading profile can be directly used as a seed vector. Using seed vectors based on currently-used bit loading profiles beneficially influences the new bit loading profiles to be more like the previously-used bit loading profiles, minimizing perturbation to the system.

Another type of system information that can be used to select seed vectors is to use the optimum bit loading vectors associated with the most used cable modems in the system. However, to not use closely correlated seed vectors, a minimum vector distance should preferably be maintained across all seed vectors. For example, assuming that optimum bit loading vector $V_1$ for the most used cable modem is used for seed vector $S_1$, if the distance between $S_1$ and the optimum bit loading vector $V_2$ for the second most utilized cable modem is less than a threshold distance D, then the optimum bit loading vector for the next most utilized cable modem vector greater than distance D from $S_1$ can be used as seed vector $S_2$. The vector used for $S_3$ would accordingly need to be greater than distance D from each of $S_1$ and $S_2$, and so forth, until all seed vectors are chosen for the "N" number of groupings of cable modems.

Figure 4:
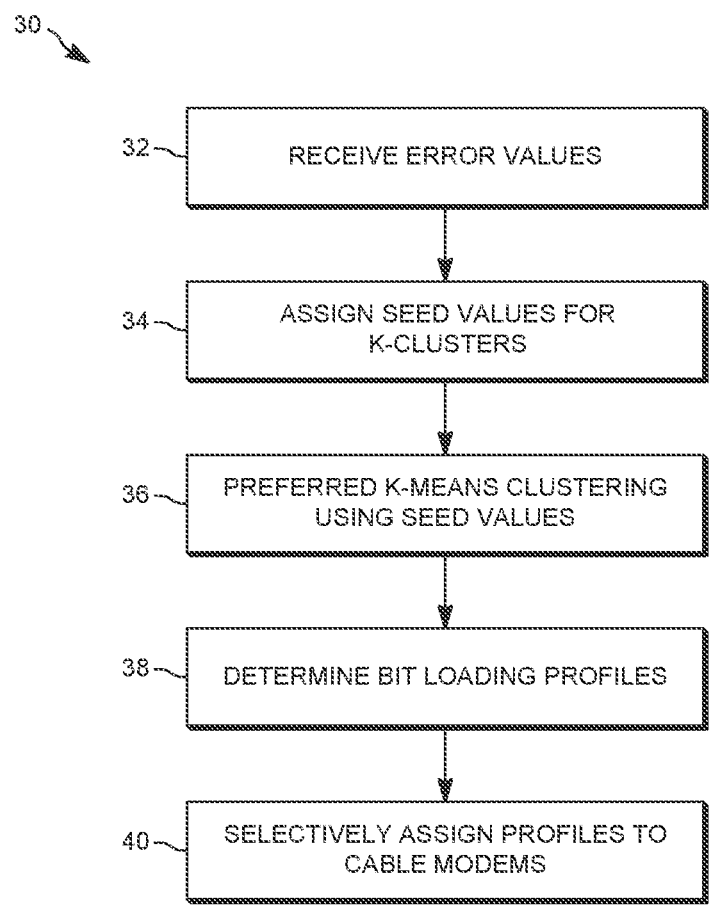
FIG. 4 shows a method of assigning cable modems to one or more groups and determining the bit loading profiles used by the plurality of cable modems.

FIG. 4 illustrates a method 30 for organizing cable modems 16 into groups that each share a subsets of bit loading profiles assignable by a CCAP 12, and for determining each of the shared subsets. At step 32, the CCAP 12 receives error values from each of the cable modems 16 or alternatively calculates error values from upstream data transmitted by the cable modems 16. At step 34, seed values are assigned for K-clusters. In a preferred embodiment, current system information is used to select the seed vectors, as described above. Alternatively, seed vectors may be assigned randomly or by any other method. At step 36, a K-means clustering procedure is implemented using those seed vectors to arrange all cable modems into a desired number of groups.

At step 38, given the groups of cable modems and their respective centroids and/or individual error metrics, a set of bit loading vectors used by a CCAP 12 to exchange data with the population of cable modems is determined. At step 40, selective subsets of bit loading profiles are assigned to each cable modem in the groups determined in step 36.

Those of ordinary skill in the art will recognize that the foregoing functions of the CCAP 12 may be performed by an external processing device, such as the device 13 shown in FIG. 1, connected or otherwise networked to the CCAP 12. Thus, such a device 13 may be optionally used to download or measure network data such as MER data, current bit loading profiles, etc. from the CCAP, and to process such data by performing any of the disclosed K-means clustering techniques and return new network parameters such as an updated set of bit loading profiles to the CCAP for transmission throughout the network. The device 13 may be a laptop, tablet, workstation etc. and may be interconnected to the CCAP 12 by any appropriate means, including a cabled connection, a wireless network connection, etc.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system comprising a head end in operable communication with a population of cable modems,
    each of said cable modems using a respective initial subset of bit loading profiles assigned by the head end,
    each respective initial subset selected from among a set of initial bit loading profiles used by the head end to communicate to the population of cable modems,
    the head end dynamically updating at least one respective initial subset to an updated subset based on information determined through the use of the set of initial bit loading profiles in the system;
    where the information determined through the use of the set of initial bit loading profiles in the system comprises a plurality of optimum bit loading vectors associated with the most used cable modems in the system.

2. The system of claim 1 where the initial subset of bit loading profiles and the updated subset are each determined by the head end based on organizing the population of cable modems into a plurality of groups.

3. The system of claim 2 where the head end organizes the population of cable modems into a plurality of groups using a K-means clustering technique.

4. The system of claim 3 where information from the initial subset of bit loading profiles is used to select seed vectors.

5. The system of claim 4 where at least some of the initial subset of bit loading profiles are used as seed vectors in the K-means clustering technique.

6. The system of claim 5 where seed vectors of the K-means clustering technique are selected based on the initial bit loading profiles used by cable modems chosen by the head end from among the population of cable modems.

7. The system of claim 6 where the chosen cable modems are selected based on the amount of activity in the cable modems in the system.

8. The system of claim 6 where the seed vectors are chosen using a minimum vector distance between the seed vectors.

9. The system of claim 4 where using information from the initial set of bit loading profiles to determine the seed vectors reduces perturbation of the system relative to randomly selecting seed vectors.

10. The method of claim 1 including using information from the initial subset of bit loading profiles to select seed vectors.

11. The method of claim 1 including using at least some of the initial subset of bit loading profiles as seed vectors in a K-means clustering technique.

12. The method of claim 11 where seed vectors of the K-means clustering technique are selected based on the initial bit loading profiles used by cable modems chosen by the head end from among the population of cable modems.

13. The method of claim 12 including selecting the chosen cable modems based on the amount of activity in the cable modems in the system.

14. The method of claim 12 including choosing the seed vectors using a minimum vector distance between the seed vectors.

* * * * *